United States Patent
Peng et al.

(10) Patent No.: US 10,082,859 B2
(45) Date of Patent: Sep. 25, 2018

(54) DIGITAL POWER SUPPLY DEVICE AND OPERATION METHOD THEREOF

(71) Applicant: ASUSTeK COMPUTER INC., Taipei (TW)

(72) Inventors: Chih-Yung Peng, Taipei (TW); Nung-Te Huang, Taipei (TW); Chih-Wan Hsu, Taipei (TW); Ming-Chuan Lee, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/716,740

(22) Filed: Sep. 27, 2017

(65) Prior Publication Data

US 2018/0095515 A1   Apr. 5, 2018

(30) Foreign Application Priority Data

Oct. 3, 2016   (TW) .............................. 105131931 A

(51) Int. Cl.
   *G06F 1/32*   (2006.01)
   *H02J 1/14*   (2006.01)

(52) U.S. Cl.
   CPC .............. *G06F 1/3243* (2013.01); *H02J 1/14* (2013.01)

(58) Field of Classification Search
   CPC ................................. G06F 1/3243; H02J 1/14
   See application file for complete search history.

(56) References Cited

U.S. PATENT DOCUMENTS

| | | | |
|---|---|---|---|
| 7,034,733 B2 | 4/2006 | Dedic et al. | |
| 7,969,043 B2 | 6/2011 | Caraghiorghiopol et al. | |
| 8,060,764 B2 | 11/2011 | Rui | |
| 2016/0226235 A1* | 8/2016 | Lathrop | H02H 3/08 |

FOREIGN PATENT DOCUMENTS

| | | |
|---|---|---|
| CN | 101431243 B | 12/2011 |
| CN | 101872228 B | 7/2012 |

* cited by examiner

*Primary Examiner* — Daniel Cavallari
(74) *Attorney, Agent, or Firm* — McClure, Qualey & Rodack, LLP

(57) ABSTRACT

A digital power supply device is provided. The digital power supply device comprises a digital power supply controller, a switch and a control module. The digital power supply controller includes a first digital power supply module configured to generate and provide a first electric energy to a first load via a first path; and a second digital power supply module configured to generate a second electric energy. The switch is electrically connected to the second digital power supply module. The control module is configured to send a control command to the switch to control the switch electrically connected to the first path or a second path. An operation method of a digital power supply device is also provided.

10 Claims, 3 Drawing Sheets

US 10,082,859 B2

DIGITAL POWER SUPPLY DEVICE AND OPERATION METHOD THEREOF

CROSS-REFERENCE TO RELATED APPLICATION

This application claims the priority benefit of Taiwan application serial No. 105131931, filed on Oct. 3, 2016. The entirety of the above-mentioned patent application is hereby incorporated by references herein and made a part of specification.

BACKGROUND OF THE INVENTION

Field of the Invention

The disclosure relates to power supply technology and, more specifically, to a digital power supply device and an operation method thereof.

Description of the Related Art

In general, a microcontroller (MCU) or a digital signal processor (DSP) of a digital power supply device is used to manage analog power supplies more precisely. Algorithms maybe applied to the digital power supply device to manage or control the whole power supply system. When the load outputted from the power supply is complex, the digital power supply device has more advantageous over an analog power supply device.

However, each power supply module in the digital power supply device provides power to a corresponding load separately. When part of the loads are not under operation, the corresponding power supply modules stop providing power so that the operating efficiency of the power supply modules cannot achieve to an optimal condition.

BRIEF SUMMARY OF THE INVENTION

According to an aspect of the disclosure, a digital power supply device is provided. The digital power supply device comprises a digital power supply controller, a switch and a control module. The digital power supply controller comprises a first digital power supply module configured to generate and provide a first electric energy to a first load via a first path; and a second digital power supply module configured to generate a second electric energy. The switch is electrically connected to the second digital power supply module. The control module is configured to send a control command to the switch to make the switch electrically connected to the first path or a second path. When the switch is electrically connected to the second path, the second digital power supply module provides the second electric energy to a second load via the second path. When the switch is electrically connected to the first path, the second digital power supply module provides the second electric energy to the first load via the first path.

According to another aspect of the disclosure, an operation method of a digital power supply device is provided. The operation method of the digital power supply device is adapted to a digital power supply controller. The digital power supply controller includes a first digital power supply module and a second digital power supply module. The second digital power supply module is electrically connected to a switch. The operation method comprises: generating a first electric energy by the first digital power supply module, and providing the first electric energy to a first load via a first path; generating a second electric energy by the second digital power supply module; making the switch electrically connected to the first path or the second path by a control module; and providing the second electric energy to a second load by the second digital power supply module via the second path when the switch is electrically connected to the second path, and providing the second electric energy to the first load by the second digital power supply module via the first path when the switch is electrically connected to the first path.

In embodiments of the digital power supply device disclosed in the disclosure, the digital power supply module corresponding to an inoperative load is alternatively combined to other digital power supply modules with power requirement. The usage and the efficiency of the whole digital power supply device are thus enhanced.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1A:
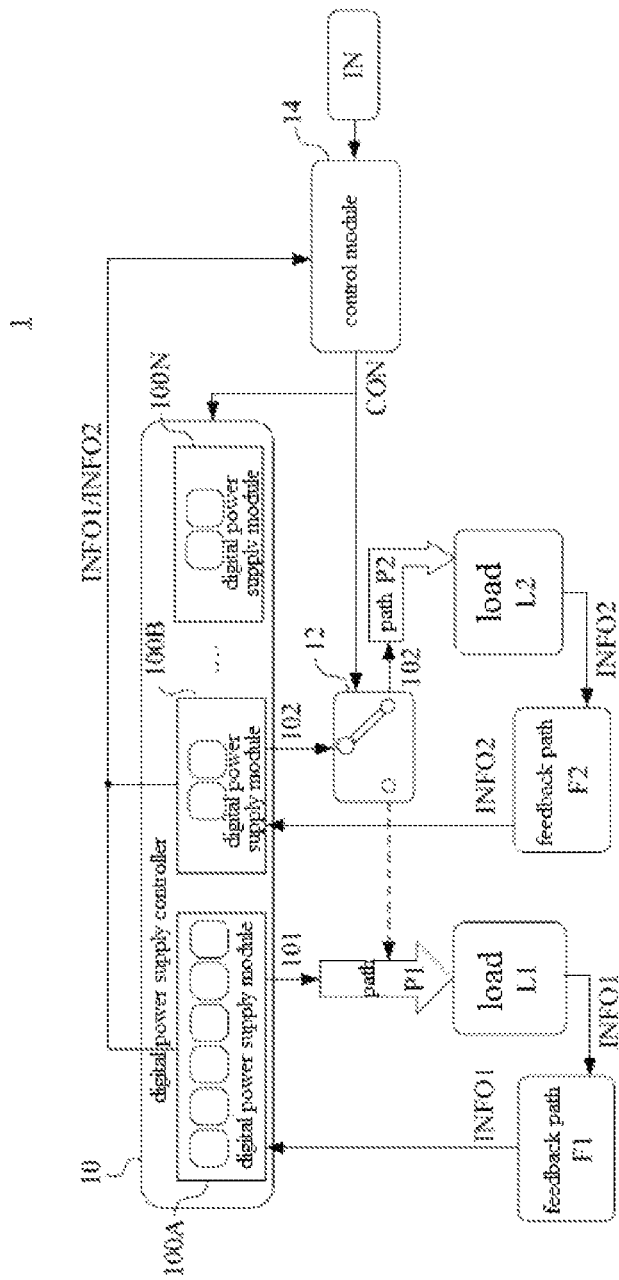
FIG. 1A and FIG. 1B are block diagrams showing a digital power supply device in different operation states in an embodiment.
Figure 1B:
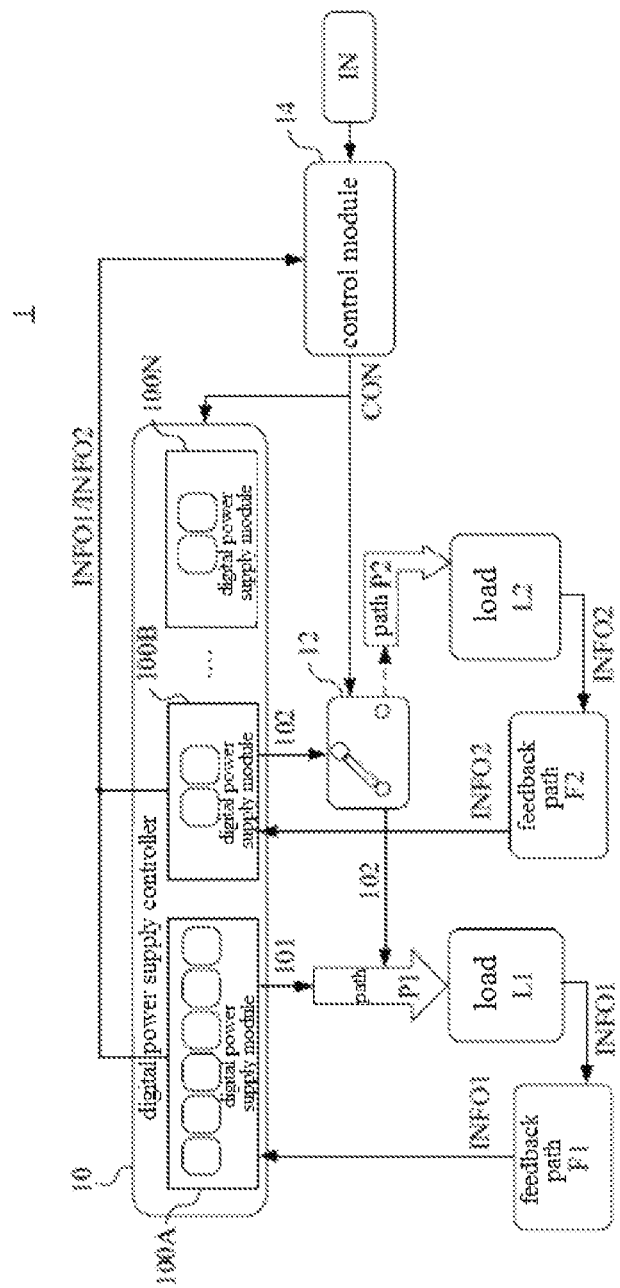

Please refer to FIG. 1A and FIG. 1B. FIG. 1A and FIG. 1B are block diagrams showing a digital power supply device in different operation states in an embodiment. In an embodiment, a digital power supply device 1 includes a digital power supply controller 10, a switch 12 and a control module 14.

The digital power supply controller 10 includes a plurality of digital power supply modules 100A, 100B . . . 100N. In an embodiment, the digital power supply modules 100A, 100B . . . 100N are microcontrollers (MCU) or digital signal processors (DSP) for power management.

In FIG. 1A and FIG. 1B, the number of the digital power supply modules 100A, 100B . . . , 100N is exemplified only for illustration. In embodiments, the number of the digital power supply modules is various according to requirements, which is not limited herein. Details for the disclosure are described hereinafter with reference to the digital power modules 100A and 100B.

In an embodiment, the digital power supply module 100A is configured to generate electric energy 101 and supply the electric energy 101 to a load L1 via a path P1. The digital power supply module 100B is configured to generate electric energy 102. In an embodiment, the electric energy 101 is an M-phase power supply. The electric energy 102 is an N-phase power supply.

The switch 12 is electrically connected to the digital power supply module 100B. The control module 14 is configured to generate a control command CON and send the control command CON to the switch 12 to make the switch 12 electrically connected to the path P1 or the path P2.

As shown in FIG. 1A, when the switch 12 is electrically connected to the path P2, a connection between the switch 12 and the path P1 is shown as a dashed line. The digital power supply module 100B provides electric energy 102 to the load L2 via the path P2. The digital power supply module 100A provides electric energy 101 to the load L1 via the path P1. The digital power supply module 100A provides the M-phase electric energy 101 to the load L1 via the path P1. The digital power supply module 100B provides the N-phase electric energy 102 to the load L2 via the path P2, respectively.

As shown in FIG. 1B, when the switch 12 is electrically connected to the path P1, a connection between the switch 12 and the path P2 is shown as a dashed line. Then, the digital power supply module 100B provides electric energy 102 to the load L1 via the path P1, and the digital power supply module 100B does not provide electric energy to the load L2. The digital power supply module 100A still provides electric energy 101 to the load L1 via the path P1. Thus, the two digital power supply modules 100A and 100B provide a combination of (M+N)-phase electric energy 101 and 102 to the load L1 via the common path P1.

An operation mechanism for the digital power supply modules 100A and 100B, the control module 14 and the switch 12 is described in detail hereinafter.

In an embodiment, the path P1 corresponds to the load L1, and the path P2 corresponds to the load L2, respectively. The load L1 sends load information INFO1 to the digital power supply module 100A via a feedback path F1. The load L2 sends load information INFO2 to the digital power supply module 100B via a feedback path F2. In an embodiment, the load L1 and the load L2 obtain the load information INFO1 and the load information INFO2 via detectors that are configured in an internal circuit, respectively.

In an embodiment, each of the load information INFO' and the load information INFO2 includes one or a combination of current information, voltage information, power consumption information of the load L1 and the load L2, respectively. Therefore, the digital power supply module 100A and the digital power supply module 100B obtain load capacities and operation states of the load L1 and the load L2 from the load information INFO' and the load information INFO2, respectively.

In an embodiment, the control module 14 actively obtains the load information INFO' and the load information INFO2 from the digital power supply module 100A and the digital power supply module 100B, respectively. In an embodiment, the digital power supply module 100A and the digital power supply module 100B actively send the load information INFO' and the load information INFO2, respectively, to the control module 14. In an embodiment, the control module 14 accesses the load information INFO1 and the load information INFO2 directly from the loads L1 and L2, but not from the digital power supply module 100A and the digital power supply module 100B, respectively.

The control module 14 is configured to generate the corresponding control command CON according to the load information INFO2. When the control module 14 determines that the load L2 is under operation according to the load information INFO2, the control module 14 sends the control command CON to control the switch 12 electrically connected to the path P2. The control module 14 also sends the control command CON to the digital power supply modules 100A and 100B. Then, the digital power supply module 100A provides the M-phase electric energy 101 to the load L1 via the path P1, and the digital power supply module 100B provides the N-phase electric energy 102 to the load L2 via the path P2, respectively.

When the control module 14 determines that the load L2 is an inoperative load (for example, the load L2 is in idle) according to the load information INFO2, the control module 14 sends the control command CON to the switch 12 to make the switch 12 electrically connected to the path P1. The control module 14 also sends the control command CON to the digital power supply modules 100A and 100B to make the digital power supply modules 100A and 100B cooperate to provide the combined (M+N)-phase electric energy 101 and 102 to the load L1 via the path P1.

In an embodiment, electric energy 101 provided by the digital power supply module 100A is a six-phase power to supply to the high-loaded load L1. The electric energy 102 provided by the digital power supply module 100B is a two-phase power to supply to the low-loaded load L2. When the load L2 is an inoperative load, the digital power supply module 100B and the digital power supply module 100A cooperate to provide a combination of eight-phase power (electric energy 101 and 102) to the high-loaded load L1.

In the embodiments, the number of phases of power is exemplified only for description, which is not limited herein. In an embodiment, power with more phases is combined to power with less phases according to requirements.

In the embodiment, the power of the inoperative load L2 is combined to the power of the high-loaded load L1. Thus, the usage and efficiency of the whole digital power supply device 1 are improved.

In an embodiment, another switch corresponding to the digital power supply module 100A is configured at the digital power supply device 1. When needed, the power provided by the digital power supply module 100A is adjusted to provide the combined power of the digital power supply modules 100A and 100B to the load L2. The above power coordination and combination mechanism can be configured between any two of the digital power supply modules 100A, 100B . . . 100N in the digital power supply device 1. Thus, multiple digital power supply modules can be adjusted simultaneously to have high usage of the power supplies.

Figure 2:
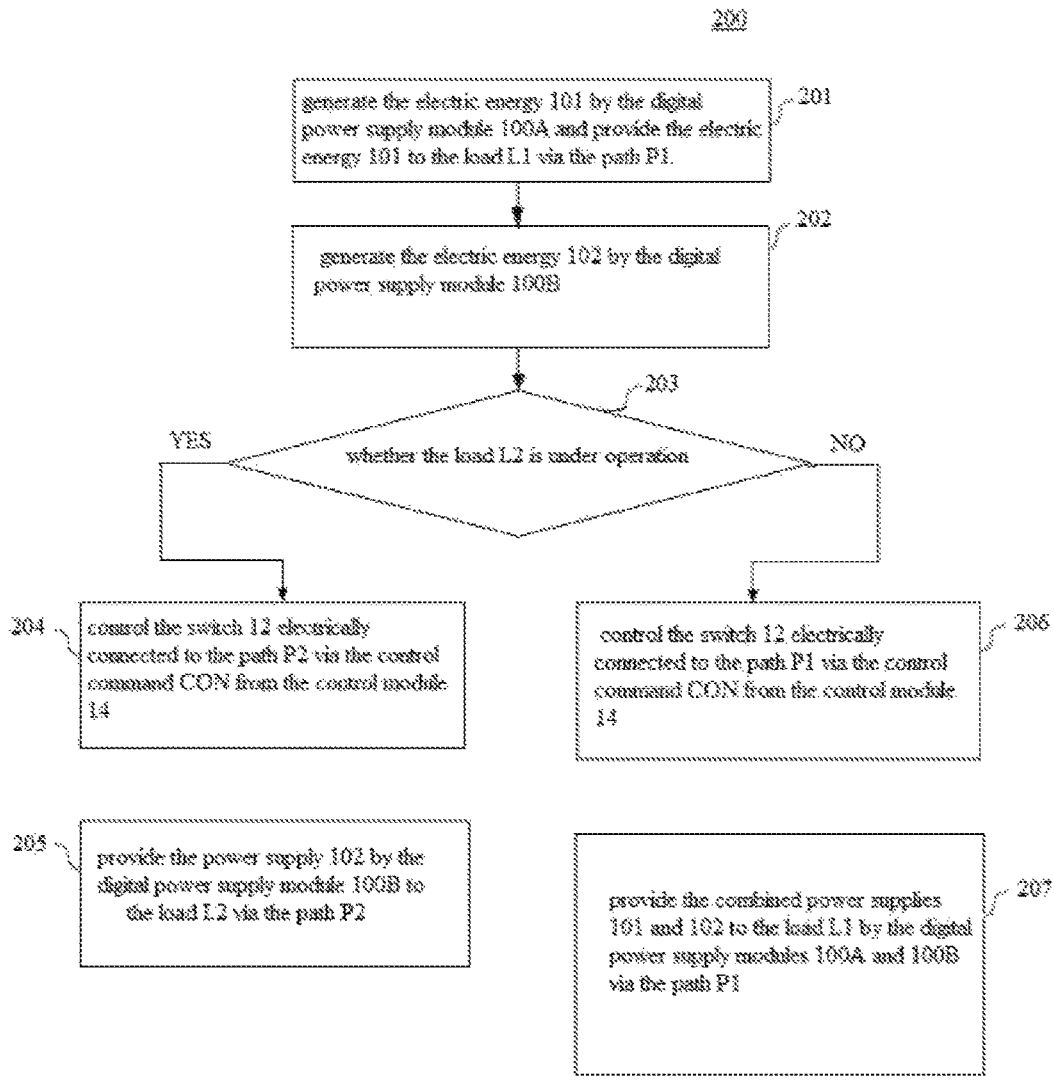
FIG. 2 is a flow chart of an operation method of a digital power supply device in an embodiment.

Please refer to FIG. 2. FIG. 2 is a flow chart of an operation method 200 of a digital power supply device in an embodiment. In an embodiment, an operation method 200 of a digital power supply device is applied in the digital power supply device 1 shown in FIG. 1A and FIG. 1B. The operation method 200 of the digital power supply device includes following steps. It should be understood that unless mentioned otherwise, the sequence of the steps in the embodiment can be changed according to requirements. In an embodiment, all/part of the steps of the method are performed simultaneously.

In step 201, the electric energy 101 is generated by the digital power supply module 100A of the digital power supply controller 10 in the digital power supply device 1. The electric energy 101 is provided to the load L1 via the path P1.

In step 202, the electric energy 102 is generated by the digital power supply module 100B of the digital power supply controller 10.

In step 203, whether the load L2 is under operation is determined by the control module 14 according to load information INFO2.

In an embodiment, the load L1 sends the load information INFO1 to the digital power supply modules 100A via the feedback path F1. The load L2 sends the load information INFO2 to the digital power supply module 100B via the feedback path F2. In an embodiment, the control module 14 accesses the load information INFO1 from the digital power supply modules 100A, and the control module 14 accesses the load information INFO2 from the digital power supply modules 100B. In an embodiment, the digital power supply modules 100A and 100B send the load information INFO1 and INFO2, respectively, to the control module 14.

When the control module 14 determines that the load L2 is under operation in step 203, step 204 is performed. The control command CON from the control module 14 controls the switch 12 electrically connected to the path P2.

In step 205, the digital power supply module 100B provides the electric energy 102 to the load L2 via the path P2.

When the control module 14 determines that the load L2 is not under operation (that is, the load L2 is an inoperative load) in step 203, step 206 is performed. The control command CON is sent by the control module 14 to the switch 12 to control the switch 12 electrically connected to the path P1.

In step 207, the digital power supply modules 100A and 100B provide the combined electric energy 101 and 102 to the load L1 via the path P1.

In the above embodiments, the control command CON is generated by the control module 14 according to the load information INFO2. In other embodiments, the control command CON is generated in other ways. In an embodiment, the control command CON is generated by the control module 14 according to a user input IN received by a user interface. Thus, the power cooperation and combination mechanism for the digital power supply device 1 are controlled via a manual input according to requirements.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A digital power supply device comprising:
   a digital power supply controller including:
      a first digital power supply module configured to generate and provide a first electric energy to a first load via a first path; and
      a second digital power supply module configured to generate a second electric energy;
   a switch electrically connected to the second digital power supply module; and
   a control module configured to send a control command to the switch to make the switch electrically connected to the first path or a second path;
   wherein when the switch is electrically connected to the second path, the second digital power supply module provides the second electric energy to a second load via the second path, when the switch is electrically connected to the first path, the second digital power supply module provides the second electric energy to the first load via the first path.

2. The digital power supply device according to claim 1, wherein the first digital power supply module generates a M-phase first electric energy, and the second digital power supply module generates a N-phase second electric energy;
   when the switch is electrically connected to the first path, the control module further sends the control command to the first digital power supply module and the second digital power supply module to make the first digital power supply module and the second digital power supply module provide a (M+N)-phase electric energy to the first load via the first path.

3. The digital power supply device according to claim 1, wherein the control module accesses first load information from the first load and accesses second load information from the second load, and the control command is generated by the control module according to the second load information.

4. The digital power supply device according to claim 3, wherein the control module determines whether the second load is under operation according to the second load information, when the second load is under operation, the control module sends the control command to control the switch electrically connected to the second path; when the second load is not under operation, the control module sends the control command to control the switch electrically connected to the first path.

5. The digital power supply device according to claim 3, wherein the first digital power supply module receives the first load information via a first feedback path, the second digital power supply module receives the second load information via a second feedback path, the control module obtains the first load information from the first digital power supply module and obtains the second load information from the second digital power supply module.

6. The digital power supply device according to claim 3, wherein the first digital power supply module receives the first load information via a first feedback path, the second digital power supply module receives the second load information via a second feedback path, the first digital power supply module sends the first load information to the control module, and the second digital power supply module sends the second load information to the control module, respectively.

7. The digital power supply device according to claim 3, wherein the first load information and the second load information include one or a combination of current information, voltage information and a power consumption of the first load and the second load, respectively.

8. The digital power supply device according to claim 1, wherein the control command is generated when the control module receives an input on a user interface.

9. An operation method of a digital power supply device, adapted to a digital power supply controller including a first digital power supply module and a second digital power supply module, the second digital power supply module is electrically connected to a switch, the operation method comprising:
   generating a first electric energy by the first digital power supply module and providing the first electric energy to a first load via a first path;
   generating a second electric energy by the second digital power supply module;
   making the switch electrically connected to the first path or the second path by a control module; and
   providing the second electric energy to a second load by the second digital power supply module via the second path when the switch is electrically connected to the second path, and providing the second electric energy to the first load by the second digital power supply module via the first path when the switch is electrically connected to the first path.

10. The operation method of the digital power supply device according to claim 9, wherein the first digital power supply module is configured to generate aM-phase first electric energy, the second digital power supply module is configured to generate a N-phase second electric energy, the operation method of the digital power supply device further includes:
   sending the control command to the first digital power supply module and the second digital power supply module by the control module when the switch is electrically connected to the first path, to make the first digital power supply module and the second digital power supply module provide a (M+N)-phase electric energy to the first load via the first path.

* * * * *